July 3, 1923.
A. B. CADMAN
DUMPING VEHICLE
Filed March 26, 1921    3 Sheets-Sheet 1
1,460,810
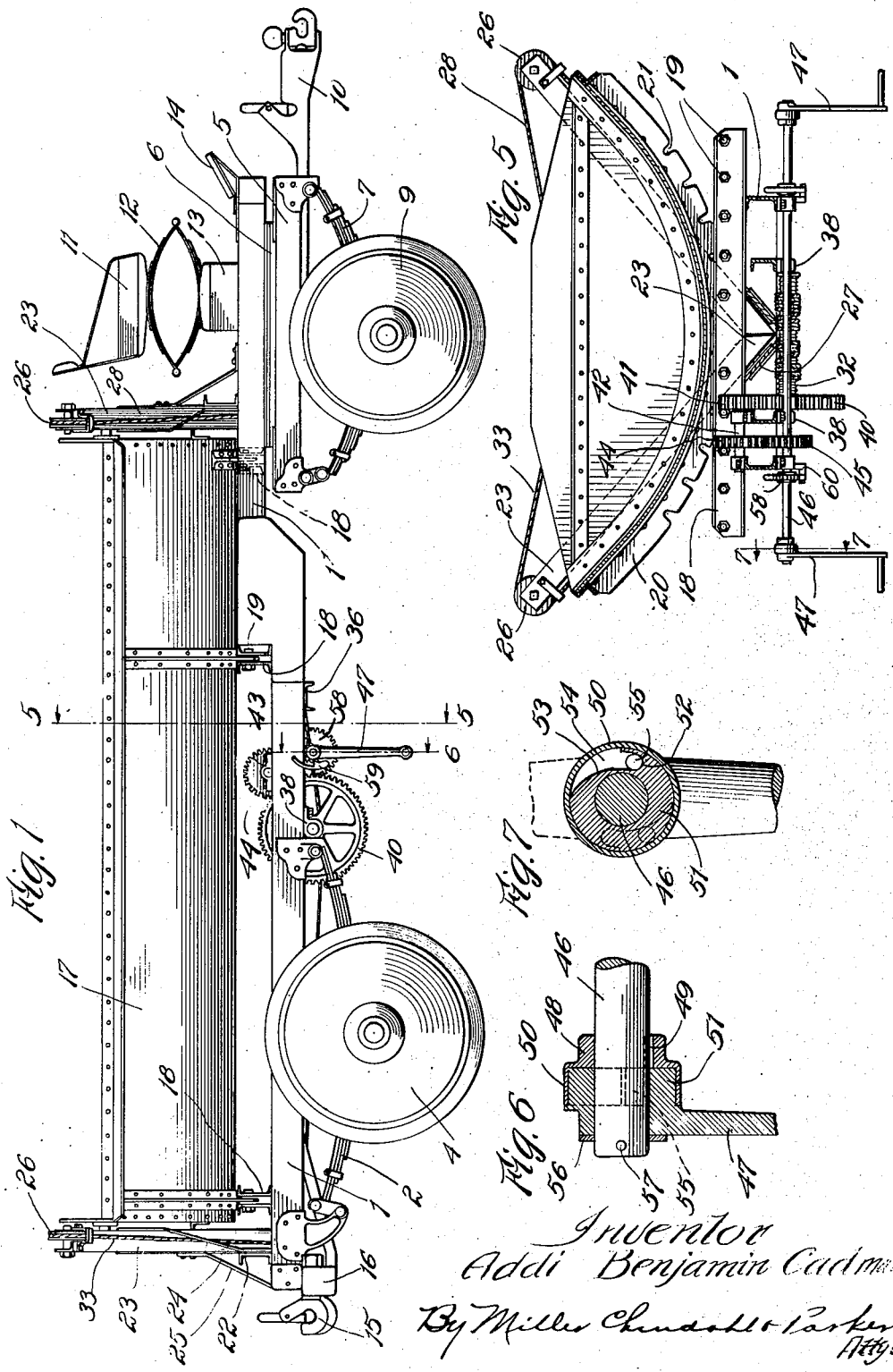

July 3, 1923.
A. B. CADMAN
DUMPING VEHICLE
Filed March 26, 1921
1,460,810
3 Sheets-Sheet 2
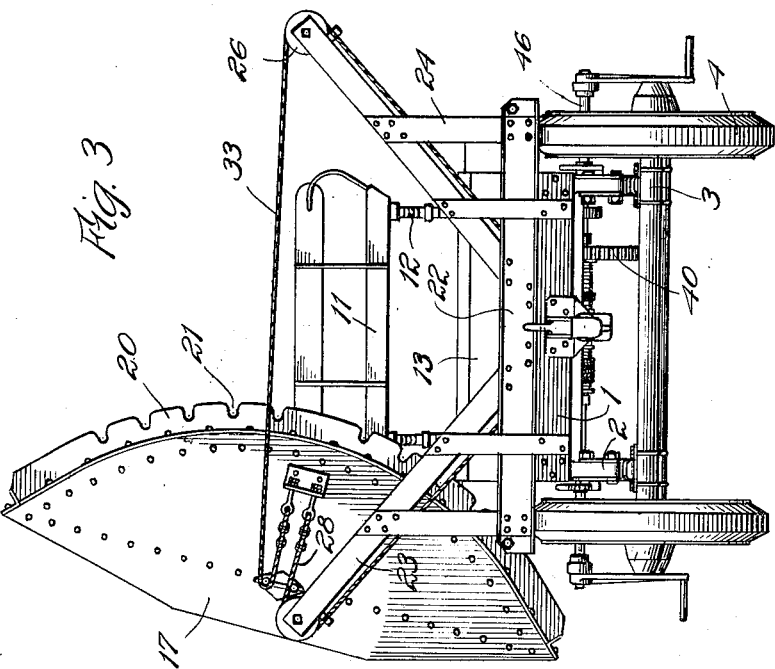
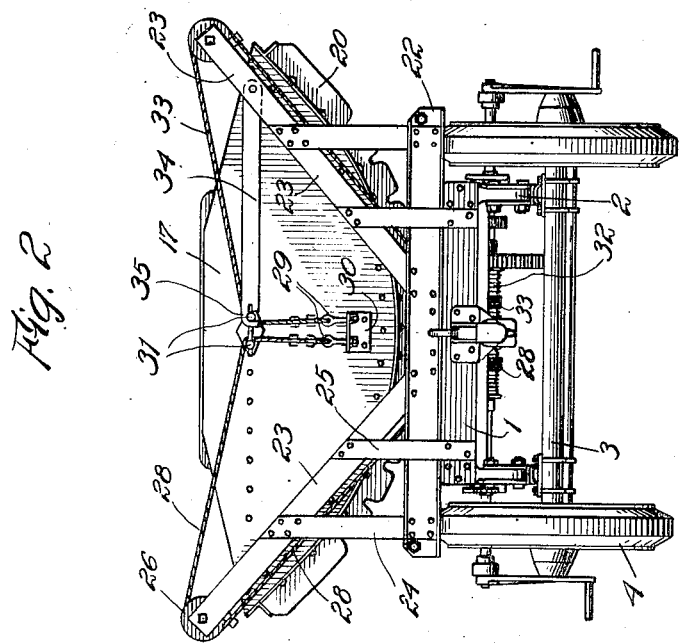
Inventor
Addi Benjamin Cadman
By Miller Chindahl & Parker
Attys July 3, 1923.

A. B. CADMAN 1,460,810

DUMPING VEHICLE

Filed March 26, 1921

3 Sheets-Sheet 3

Fig. 4

Inventor
Addi Benjamin Cadman
By Miller Chindahl & Parker
Att'ys

Patented July 3, 1923.

1,460,810

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF WISCONSIN.

DUMPING VEHICLE.

Application filed March 26, 1921. Serial No. 455,841.

*To all whom it may concern:*

Be it known that I, ADDI BENJAMIN CADMAN, a citizen of the United States, residing at Beloit, in the county of Rock and State of Wisconsin, have invented certain new and useful Improvements in Dumping Vehicles, of which the following is a specification.

The invention relates to dump trucks and more especially to a dirigible side dump truck of the trailer type having manually operable dumping mechanism.

In a trailer dump truck which is without self-propelling power adaptable to drive dumping mechanism, it is essential that the truck construction be such as will facilitate in the greatest degree the dumping operation, and that the manually operated means provided for discharging a load from the body has ample power, and that it is easily and safely operable with positive control at all times.

An object of this invention is to provide a dump truck of improved construction having a movable body operable to be tilted toward either side of the truck and to discharge its load by gravity.

Another object is to provide a body and frame construction including an improved support for the body which enables the latter to be readily rolled or rocked to either side for the discharge of its load without displacement of the body upon its support.

Another object of the invention is to provide new and improved operating means for tilting the body, which embodies positive and easy manual control of the dumping operation and assures efficient service.

A further object is to provide a manually operable dumping mechanism which is arranged to eliminate danger to the operator in dumping the body, and in returning the latter to normal position.

A further object is to provide a dump truck which is particularly adapted to the collection and disposal of city garbage, being maneuverable in narrow alleys and arranged to be drawn by horses or coupled as a trailer to a tractor vehicle. Having in view the objects thus generally stated and others apparent in the following description, the invention comprises the novel features of construction, arrangement and combination of parts hereinafter described and claimed and illustrated in a preferred form in the accompanying drawings, wherein:

Figure 1 is a side elevation of the truck showing the body in normal position. Fig. 2 is an end view showing the body in normal position, and Fig. 3 is a similar end view showing the body in dumping position. Fig. 4 is a plan view with the body partly broken away to disclose the cable drum and its operating mechanism. Fig. 5 is a cross sectional view taken in the vertical plane of the line 5—5 of Fig. 1. Fig. 6 is a sectional view of the handle clutch taken on the line 6—6 in Fig. 1, and Fig. 7 is a cross section of the clutch.

In the drawings, the numeral 1 indicates a truck frame of the drop type of construction supported at its rear end upon springs 2 carrying an axle 3 upon which are mounted wheels 4. Beneath the raised portion of the front end of the frame 1 is a sub-frame 5 pivoted to the main frame and rotatable in relation thereto on a vertical axis, fifth wheel bearings 6 being provided between the sub-frame and main frame. The sub-frame 5 is supported upon springs 7 mounted upon an axle 8 which carries the front wheels 9. This construction of the front end in a dirigible truck gives a very short turning radius, the sub-frame being capable of swinging through an arc greater than a half revolution, and permits turning the truck within its own length.

Suitably attached to the front end of the sub-frame 5 is a draw-bar 10. The draw-bar 10 is constructed for the attachment of a suitable draft link by which the truck may be drawn and steered by a tractor vehicle, and which also may be adapted to carry whiffle-trees to which horses may be hitched for drawing the truck. For the convenience of a driver in the latter case, a seat 11 is provided upon springs 12 carried on a box support 13 fixed upon the forward end of the truck frame. A foot-rest 14 is also provided, secured to the front frame member. Draft means is also provided at the rear end of the truck for coupling two or more of them in a train, and comprising a drawhead 15 suitably secured in a bracket 16 mounted on the rear end member of the truck frame.

The construction of the truck with reference to the facilities provided for its movement renders it particularly adaptable to the collection of refuse and garbage from the streets and alleys of a municipality. The extremely short turning radius permits of its being maneuvered in narrow alleys and short spaces for loading from scattered piles of such refuse. A fleet of such trucks may be operated in the same vicinity, the trucks being drawn by a team of horses while being loaded, and when filled the trucks may be drawn to an available location on the street and the horses removed for other work, leaving the trucks to be subsequently coupled together with a tractor making the rounds of the vicinity. A train of such trucks may be drawn by the tractor to a garbage dump, usually located at a considerable distance in the outskirts of a city, there unloaded and upon return may be separately left at scattered locations for reloading.

The truck is provided with a dump body 17 constructed with a curved bottom and closed ends which is water-tight and particularly adapted for carrying garbage and loose materials. The body 17 is supported by means of pairs of spaced cross rails 18 mounted on the truck frame 1, and located at the front and rear ends of the body and intermediately thereof. Each pair of cross rails carries a series of regularly spaced bolts 19 (Fig. 5) extending transversely through the two rails. Secured to the under side of the body and positioned above each pair of rails is a depending flange member 20 extending between the rails of each pair and supporting the body thereupon. The flange member 20 is curved suitably to permit the body to rest normally in equilibrium upon the centers of the rails 18 in upright position, and at the same time facilitate the easy rolling of the body in either lateral direction to discharge its load. Each of the depending flanges has regularly spaced notches 21 provided in its outer edge and adapted to engage the bolts 19 between the cross rails 18. In the rolling of the body for dumping at either side of the truck, its position upon the frame is at all times controlled by the interengaging bolts and notched flanges, thus securing the body against displacement.

The tilting or rolling movement of the body is accomplished by the use of suitable mechanical operating gearing as, for example, cables secured to the end members of the body and adapted to draw the latter to one side or the other by means of a cable drum manually operable by an operator positioned at either side of the truck. At the front and rear ends of the body and spaced therefrom, I have provided cross members 22 fixed to the truck frame 1 and upon which are rigidly supported outwardly and upwardly inclined standards 23 intermediately braced by straps 24 extending upwardly from the cross member 22 and by straps 25 extending upwardly from the end member of the frame. Each of the inclined standards 23 carries at its upper end a pivoted cable sheave 26. At the lower end of each inclined standard and suitably pivoted thereon is a second cable sheave 27. A cable 28 having one end fixed in one of two eye bolts 29 adjustably supported in a bracket 30 fixed upon the end of the body, is passed upwardly over one of a pair of pins 31 also fixed upon the upper portion of the end of the body, and thence passing outwardly to one of the upper sheaves 26 carried by the standards 23. The cable therefrom passes downwardly along the under side of the standard and over its lower sheave 27 to a winding drum 32 located at the center of the truck frame beneath the body, and upon which a portion of the cable is wound.

From the drum the cable 28 passes to the opposite end of the body and is brought upward over the laterally opposite sheave 27, standard 23 and sheave 26, and is attached in opposite position to one of the pair of eye bolts 29 similarly mounted at that end of the body, both ends of the body being equipped with identical cable attaching means including eye bolts 29, brackets 30 and pins 31. A second cable 33 is similarly attached to the other of the eye bolts 29 at both ends of the body, and passes in crisscross relation to the other cable over the oppositely disposed sheaves 26 and 27, having its mid-portion oppositely wound upon the winding drum 32 mounted on the frame. In this way a steady even pull is communicated to both ends of the body as each cable is drawn in at one corner and paid out at the diagonally opposite corner. While I have used a pair of cables in the present construction, it is obvious that four lengths of cables may be used, each having an end fastened to the winding drum and having their other ends connected to the body as described.

By my arrangement of the cable construction I accomplish a very efficient and readily operable control of the dumping operation. Rotation of the winding drum 32 results in drawing in the portions of the two cables 28 and 32 which pass over the sheaves 26 on one side of the truck, and in paying out at an equal rate the portions of the cables which pass over the laterally opposite sheaves. The body is thus drawn on its rocker supports in a rolling motion to one side of the truck frame in position to dump its load, and by reason of the constantly taut cables is firmly supported throughout its range of movement and is under complete control of the operator at all times.

To secure the body normally in upright position, I have provided a locking bar 34 pivoted to one of the standards 23 and having a notched end 35 adapted to detachably engage one of the pins 31 to prevent swaying of the body when the truck is in motion.

The cable winding mechanism mounted upon the frame 1 beneath the body comprises a supporting frame having cross members 36 secured to the side members of the truck frame 1 and carrying longitudinal members 37 secured thereto. The cable drum 32 is journaled in bearings 38 mounted on the longitudinal members 37 and is constructed with spiral grooves adapted to receive and guide the cables in the operation of the drum. The two cables 28 and 33 are rigidly secured, as at 39, to the drum 32, and are oppositely wound about the drum in such arrangement that upon rotation of the latter the portions of the cables taken up from one side are paid out in equal proportion from the other side of the drum windings.

Mounted at one end of the cable drum 32 and rigid therewith is a gear 40 operatively engaged by a pinion 41 mounted on a countershaft 42 having bearings 43 on the longitudinal member 37 and side member of the frame 1. The countershaft 42 also carries a gear 44 which is engaged by a pinion 45 mounted on an operating shaft 46 having its bearings in the side members of the truck frame and extending outwardly from the frame at both sides to provide conveniently available means for operation of the drum winding gears by an operator positioned at the side of the truck.

The operating shaft 46 is manually operable by means of crank handles 47 provided at each end of the shaft and so constructed that the shaft may be operated from either side of the truck only to tilt the body toward the opposite side, thus avoiding the danger of tilting the body so that the load may be discharged upon the operator. The handles are also constructed so that upon releasing the body for return to normal position, neither of the handles will spin with the reverse operation of the winding gear, thereby preventing possibility of injury to the operator by the whirling crank handles.

To accomplish those ends the handles are provided with clutch mechanism comprising an annular member 48 (see Figs. 6 and 7) keyed to the operating shaft as at 49 and having a tubular extension 50 forming an outwardly opening cylindrical recess concentric with the shaft 46. The crank handles 47 are each provided with an annular portion 51 mounted upon the operating shaft in freely rotatable relation thereto and extending into the cylindrical recess formed by the tubular extension 50. The annular portion of the crank handle is constructed with a portion of its periphery cut away to form a pocket 52 one side 53 of which extends in curved relation to the periphery of the annular portion 51, and forms with the tubular extension 50 a tapered or convergent sided chamber 54. The pocket 52 is adapted to contain a roller 55 which in inoperative position rests at the bottom of the pocket and in that position permits the free turning of the shaft 46 and the member 48 in relation to the crank handles 47. The pocket is so positioned in relation to the crank handles that the roller remains therein when the handle is normally hanging in dependent position, so that the shaft may rotate without spinning the cranks. Upon turning the handle manually, the roller drops out of the pocket and is wedged between the annular portion 51 and the tubular member 50, thereby establishing positive engagement between the handle and the operating shaft and enables the operation of the drum winding gearing to dump the body of its contents. The handle is retained in position upon the shaft by means of an end plate 56 encircling the shaft and retained thereon by a cross pin 57 inserted through the end of the shaft. To hold the body in dumping position, I have provided a ratchet wheel 58 fixed upon the operating shaft and adapted to be engaged by a pawl 59 pivoted on a bracket 60 depending from the side member of the frame, the pawl being manually operable to engage the ratchet wheel and hold the winding mechanism against reverse rotation.

It will now be apparent that I have provided a dump truck construction which may be efficiently operated with facility and safety, and which accomplishes the objects herein set forth.

I claim as my invention:

1. A dump truck having a frame mounted on wheels, a body supported on said frame to be tilted sidewise for unloading, mechanical operating gearing for tilting said body, an operating shaft having driving connections with said gearing and extending out on the side of said truck, and an operating crank for said shaft having means for engaging the same to turn only in such a way as to operate the gearing to dump the truck load on the opposite side of the truck.

2. A dump truck having a frame mounted on wheels, cross rails mounted on said frame, a body adapted to be rolled laterally upon said rails, a pair of standards at each end of said body having their bases fixed on said frame, the ends of said standards being spaced apart and laterally disposed on opposite sides of the center line of said body in normal position, a sheave mounted on the end of each of said standards, a sheave mounted on the base of each of said standards, a revoluble drum mounted on said frame, a cable having its mid-portion wound upon said drum and having one end portion passing through the said sheaves on one of said standards and attached to the upper portion of the end of said body substantially at its center, the other end portion of said cable passing through the sheaves of the said standard at the opposite end and opposite side of said body and similarly attached to said body, a second cable having its mid-portion reversely wound upon said drum and having its end portions similarly disposed in the other two of said standards and similarly attached at opposite ends of said body, and manually operable means for rotating said drum.

3. A dump truck having a frame mounted on wheels, a body supported on said frame and adapted to be rolled laterally thereon, stationary sheaves at each end of said frame disposed laterally of the center of said ends, a revoluble drum mounted on said frame, a pair of cables oppositely wound on said drum at their midportions and crisscrossing with respect to each other so that the respectively opposite ends of each cable are connected to diagonally opposite corners of said body, said cables being thereby arranged to communicate a steady even pull to said body because they are drawn in at corners at opposite ends on the same side of said body and are paid out on the respectively diagonally opposite corners on the other side of the body the said body being thereby rolled toward either side of said frame selectively in the rotation of said drum, an operating shaft journalled transversely of said frame and extending outwardly from both sides thereof, driving connection between said shaft and said drum, and crank handles mounted on said shaft to rotate the same.

4. A dump truck having a frame mounted on wheels, a body on said frame adapted to roll from side to side thereon, sheaves at each end of said frame disposed laterally of the center of said ends, a drum rotatively mounted in said frame, cables oppositely wound on said drum at their midportions and crisscrossing with respect to each other so that the respectively opposite ends of each cable are connected to diagonally opposite corners of said body, said cables being thereby arranged in the operation of said drum to be drawn in at their one end to communicate a pull at the corners of said body on one side thereof and to be paid out at their other end at the diagonally opposite corners of said body on the outer side thereof so that the cables permit and yet restrain or control the movement of said body proportionally to the speed at which the cables are drawn in at their one end, said body being selectively movable toward either side of said frame in the rotation of said drum, and means operable from either side of said frame for operating said drum to dump the load of said body on the opposite side.

5. A dump truck having a frame mounted on wheels, a body supported on said frame and adapted to be rolled laterally thereon, a revoluble drum mounted on said frame, cable connections between said drum and said body whereby upon the rotation of said drum said body may be rolled selectively to either side of said frame, an operating shaft journaled on said frame and extending outwardly from both sides thereof, said shaft being operatively connected to said drum, and a pair of crank handles mounted on opposite ends of said shaft, each of said crank handles being adapted to operate said shaft in the direction only to cause said body to be rolled to the opposite side of said frame, said handles being entirely free of operative engagement with said shaft when at rest in dependent position.

6. A dump truck having a frame mounted on wheels, a body supported on said frame in laterally rocking relation thereto, cable means for tilting said body toward either side of said frame selectively, a revoluble drum having operating engagement with said cable means, an operating shaft having driving connections with said drum and extending to opposite sides of said truck frame, and a pair of manually operable cranks mounted on opposite ends of said shaft, each of said cranks being adapted to operatively engage said shaft when turned in one direction to turn freely upon said shaft in the opposite direction, and to permit said shaft to turn freely therein in either direction when said crank is at rest in dependent position.

7. In a dump truck having a body adapted to be tilted to either side thereof to discharge a load and having means for tilting said body actuated by a shaft operable from either side of said truck, a hand crank mounted on said shaft comprising a member fixed upon said shaft, said member having a longitudinally opening annular recess concentric with said shaft, a crank freely rotatable on said shaft and having an annular portion extending within said recess, a circumferential pocket formed in said annular portion and having one side thereof forming with the inner wall of said recess a convergent sided chamber, and an element freely movable in said chamber, said element operating to effect a driving connection between said annular portion and said fixed member in only one direction of rotation and remaining in said pocket free of the wall of said recess when said crank is in dependent position.

8. A dump truck having a frame mounted on wheels, a plurality of pairs of spaced cross rails mounted on said frame each of said pairs having spaced interconnecting elements extending therebetween, a body supported on said rails having curved notched flanges extending between the cross rails of each of said pairs and engaging said connecting elements successively in said notches to guide the rolling movement of said body upon said rails, a rotatable drum mounted on said frame, cable connections between said drum and said body whereby upon the rotation of said drum said body may be rolled selectively to either side of said frame, an operating shaft journaled on said frame and extending outwardly from both sides thereof, gearing connections between said shaft and said drum, and a pair of crank handles mounted on opposite ends of said shaft, each of said crank handles being adapted to operate said shaft in one direction only, said handles being entirely free of operative engagement with said shaft when at rest in depending position.

9. A dump truck having a frame mounted on wheels, a body supported on said frame and arranged to have the load dumped therefrom, a rotatable drum mounted in said frame, cable connections between said drum and said body for selectively dumping the load on either side of said truck, an operating shaft in said frame engageable at either side of the latter and having operative connection with said drum, and crank handles for said shaft on opposite sides of said frame, either of said handles being operable only in such a way as to operate the drum to dump the load on the opposite side of the truck.

10. A dump truck having a frame mounted on wheels, a plurality of horizontal cross rails mounted on said frame, a rounded bottom body arranged to roll or rock on said cross rails but prevented from displacement relative thereto, a V-shaped standard at each end of said frame, sheaves on the free ends of the divergent arms of said standards and sheaves on opposite sides of the crotches of said standards, an oppositely grooved rotatable drum in said frame operable from either side of the latter, cables crisscrossing relative to each other passing over said drum at their midportions oppositely wound thereon and extending over one of said last mentioned sheaves and one of said sheaves on the arms of said standards at respectively diagonally opposite corners of said truck and secured to the ends of said body at the upper middle portion thereof whereby in the operation of said drum a direct steady and even lateral pull is communicated at the ends of said body on the upper middle portion thereof in the drawing in of said cables at one corner of said body and paying out at the diagonally opposite corner.

In testimony whereof, I have hereunto set my hand.

ADDI BENJAMIN CADMAN.